(12) United States Patent
Evans

(10) Patent No.: US 6,668,085 B1
(45) Date of Patent: Dec. 23, 2003

(54) CHARACTER MATCHING PROCESS FOR TEXT CONVERTED FROM IMAGES

(75) Inventor: William D. Evans, Cupertino, CA (US)

(73) Assignee: Xerox Corporation, Stamford, CT (US)

( * ) Notice: Subject to any disclaimer, the term of this patent is extended or adjusted under 35 U.S.C. 154(b) by 554 days.

(21) Appl. No.: 09/630,539

(22) Filed: Aug. 1, 2000

(51) Int. Cl.[7] .............................. G06K 9/72; G06K 9/03
(52) U.S. Cl. ........................ 382/229; 382/310; 382/311
(58) Field of Search ................................. 382/185, 186, 382/187, 209, 217, 218, 219, 228, 229, 230, 309, 310, 311; 704/2; 358/406, 453, 462; 703/6, 3

(56) References Cited

U.S. PATENT DOCUMENTS

| | | | | |
|---|---|---|---|---|
| 5,768,422 A | * | 6/1998 | Yaeger | 382/228 |
| 5,774,588 A | * | 6/1998 | Li | 382/230 |
| 5,850,480 A | | 12/1998 | Scanlon | 382/229 |
| 6,005,973 A | | 12/1999 | Seybold et al. | 382/187 |
| 6,157,905 A | * | 12/2000 | Powell | 704/2 |
| 6,539,118 B1 | * | 3/2003 | Murray et al. | 382/229 |

OTHER PUBLICATIONS

Fairhurst et al, Generalized Approach to the Recognition of Structurally Similar Handwritten Characters Using Multiple Exper Classifiers, Feb. 1997, IEE Proceedings on Image Signal Processing, vol. 144, No. 1, pp. 15–22.*

Sinha et al, "Hybrid Contextual Text Recognition with String Matching", Sep. 1993, IEEE transaction on PAMI, ISBN: 0162–8828, vol. 15, No. 9, pp. 915–925.*

* cited by examiner

Primary Examiner—Mehrdad Dastouri
(74) Attorney, Agent, or Firm—Oliff & Berridge, PLC

(57) ABSTRACT

An improved method of deriving the correct text from text with errors converted from a character recognition device includes the need for significantly less human intervention for correction of the converted text. The method includes receiving as input a converted text sequence from a character recognition device, comparing a character sequence made up of one or more in-sequence characters of the converted text sequence to a first table containing either unidirectional or bi-directional substitution sequences to obtain a set of substitution sequences associated with the character sequence, and subsequently comparing the character sequence to a second table containing either unidirectional or bi-directional substitution sequences, wherein if the first table is a unidirectional table then the second table is a bi-directional table and if the first table is a bi-directional table then the second table is a unidirectional table, to obtain any additional possible substitution sequences associated with the character sequence, where the obtained character sequence and associated substitution sequences represent the set of possible text sequences for the character sequence of the converted text. The method may then further compare the possible texts to a database to see which, if any, of the possible texts matches data in the database. The method is particularly well suited for use with alphanumeric text such as product codes, part numbers, document identifiers, etc.

19 Claims, 2 Drawing Sheets

CHARACTER MATCHING PROCESS FOR TEXT CONVERTED FROM IMAGES

BACKGROUND OF THE INVENTION

1. Field of the Invention

The present invention relates to the field of electronic text processing of text derived from optical character recognition (OCR) or intelligent character recognition (ICR) devices. More specifically, this invention relates to a method and apparatus for generating reasonably possible electronic text from a text containing possible errors derived from images by optical character recognition or intelligent character recognition, and to selecting the correct text from the set of possible texts.

2. Discussion of Related Art

Document processing systems employing optical character recognition (OCR) and intelligent character recognition (ICR) devices for scanning and storing the contents of documents are well known in the art. In a typical document processing system of this nature, documents are fed into a transport scanning device which serially scans each document, stores the data and passes the document to other devices for further processing. The scanned image of each document is converted into a bit-map, i.e., digitized image data, of the entire document. The bit-mapped image data is then transmitted to a character recognition engine where the image data is analyzed in an attempt to convert desired portions of the image data into discrete electronic text characters through character recognition. If the data is successfully recognized as one or more alphanumeric characters, it is transformed into discrete alphanumeric characters for storage and future processing. For example, data thus converted into the alphanumeric characters can be stored in a conventional computer database for future access and/or electronic processing without the need to further physically handle the original documents.

Document processors employing OCR and ICR devices have been utilized to facilitate processing of pre-formatted business forms with some degree of success. For example, such processors are currently used to read information printed on checks. Automated scanning and processing of checks is advantageous because the type of information contained on checks are contained within one or more discrete fields and all of the data to be scanned is of the same type, i.e., all numerals.

However, while the use of such document processors has long offered the potential for significantly reducing costly manual information processing, in practice, OCR and ICR document processors have only enjoyed limited application because they are prone to yield inaccurate results. Restated, the full benefits of wholly automated information processing have heretofore been significantly limited by the ability of OCR and ICR based document processors to accurately recognize the data contained on the above-mentioned forms.

In particular, the OCR and ICR art has continued to struggle with the problem of automated recognition of handwritten data and data of mixed alphanumeric character. Accurate recognition of handwriting has proven to be a particularly illusive goal due to the unconstrained nature of handwriting and the large variety of handwriting styles. Thus, character recognition errors continue to severely limit the utility of document processors employing optical character recognition devices where the information to be processed has been handwritten on documents. The main error that occurs in processing is substitution errors, which occur when a given character being analyzed is incorrectly identified as another character(s). Substitution errors include (1) incorrect identification of a single character as a different character; (2) incorrect identification of a single character as multiple characters; and (3) incorrect identification of multiple characters as a single character. Because the recognition device always yields some data when a substitution error occurs, substitution errors can be difficult to detect.

Methods are known to attempt to correct such errors, but these methods are extremely limited and require excessive amounts of human intervention to solve the problem. First, errors are typically checked for on a one-to-one character replacement basis, and substitutions such as one-to-many characters, many-to-one characters and one-to-none characters are not checked, thus severely limiting the ability of the method to determine error correction.

Further, the correction methods typically involve querying a user for correction of the error, often presenting the user with an image of the error along with a set of possible corrections derived from a standard dictionary database. See, for example, U.S. Pat. No. 6,005,973, describing a method in which the process gathers the most likely character sequences associated with the error, and presents the results of the method to the user for selection of the correct character sequence.

Sometimes the dictionary database is able to correct the error to the correct text based upon a high level of confidence that it could be the only correction possible. This is only the case, however, when the converted text contains only alphabetical text that would be found in the dictionary. Where the text contains mixed alphabetical and numerical text, for example as might be found with part numbers, product codes, etc., the query to the dictionary always fails and this prior art methodology thus is inadequate to deal with such text without requiring the need for frequent human interaction. However, presenting the error to a human operator to rectify the error makes the process extremely expensive and time consuming.

U.S. Pat. No. 5,850,480 describes methods of correcting optical character recognition errors occurring during recognition of character sequences contained within one or more predetermined types of character fields. The methods may be practiced with a document processing system having (1) a optical character recognition device for scanning documents and outputting bit-map image data; (2) a recognition engine for converting the bit-map image data into possibly correct alphanumeric characters with associated confidence values; and (3) at least one lexicon of character sequences consisting of a list of at least a portion of all of the possible character sequence values for each of the fields being processed. OCR errors are corrected by performing a contextual comparison analysis between the alphanumeric characters outputted from the recognition engine and the lexicon of character sequences. However, this method is designed to work only with specific-types of texts entered into specific fields, for example address fields, of a form, looks at letters and numbers separately instead of mixed alphanumeric text, and requires assignment of confidence levels to order possible text for selection by a user.

Thus, there exists a need in the art for OCR error correction methods and apparatus capable of enhancing the accuracy of optical character recognition of machine-print and hand-print, particularly print of mixed alphanumeric characters, requiring a reduced level of human intervention for correction.

SUMMARY OF THE INVENTION

It is therefore an object of the present invention to provide an improved method, and apparatus for conducting the method, for generating versions of reasonably possible text given the text version with errors from ICR/OCR devices, particularly of text that may be of mixed alphanumeric type. It is a still further object of the present invention to conduct the method so as to reduce the amount of required human intervention required in correcting converted text with errors to correct text.

It is another object of the present invention to provide a method of deriving a set of possible correct texts from converted text with errors, and apparatus for conducting the method, in which the character substitutions examined by the method include more than just one-to-one character substitutions, but also include, for example, one-to many, many-to-many, many-to-one and one-to-none character substitutions so that the set of possible correct texts includes a larger number of possible texts of varying lengths, and thus is more likely to include the correct text within the generated set of possible texts.

These and other objects of the invention are achieved by the methods of the present invention, which provides a systematic method for generating versions of reasonably possible electronic text given the ICR/OCR version with errors. Each of these new possible versions of the image converted electronic text can then be used for matching to a database or another text source, with an error only being declared to an operator after the list of possible texts has been exhausted without a match, or with multiple matches. The method may not completely remove human intervention, but the need for such intervention is greatly reduced. A great advantage of the method of generating the possible forms of the text is that it extends the obvious substitution method (e.g., one-to-one such as the number zero for the letter O or vice versa) by using one-to-many, many-to-one, many-to-many and one-to-none substitutions based on commonly occurring errors.

These and other objects of the invention are thus achieved by a method of, and apparatus for, deriving a set of possible text sequences for character sequences of converted text, comprising receiving as input a converted text sequence from a character recognition device; comparing a character sequence comprised of one or more in-sequence characters of the converted text sequence to a first table containing either unidirectional or bi-directional substitution sequences to obtain a set of substitution sequences associated with the character sequence; and subsequently comparing the character sequence to a second table containing either unidirectional or bi-directional substitution sequences, wherein if the first table is a unidirectional table then the second table is a bi-directional table and if the first table is a bi-directional table then the second table is a unidirectional table, to obtain any additional possible substitution sequences associated with the character sequence; the obtained character sequence and associated substitution sequences representing the set of possible text sequences for the character sequence of the converted text.

These and other objects are thus also achieved by a method of, and apparatus for, matching converted text from a character recognition device to correct text, comprising receiving as input a length of converted text sequence from a character recognition device; evaluating the length of converted text sequence and determining possible erroneous character sequences comprised of one or more in-sequence character sequences; comparing character sequences comprised of one or more in-sequence character sequences of the converted text sequence to at least one table containing substitution sequences to obtain a set of substitution sequences associated with each such character sequence evaluated, thereby obtaining a master group of possible text sequences for the length of the converted text sequence; and comparing the master group of possible text sequences for the length of the converted text sequence to an external database for a match. This method can also be carried out only upon those character sequences determined to have a likelihood of being erroneous.

DETAILED DESCRIPTION OF PREFERRED EMBODIMENTS

Figure 1:
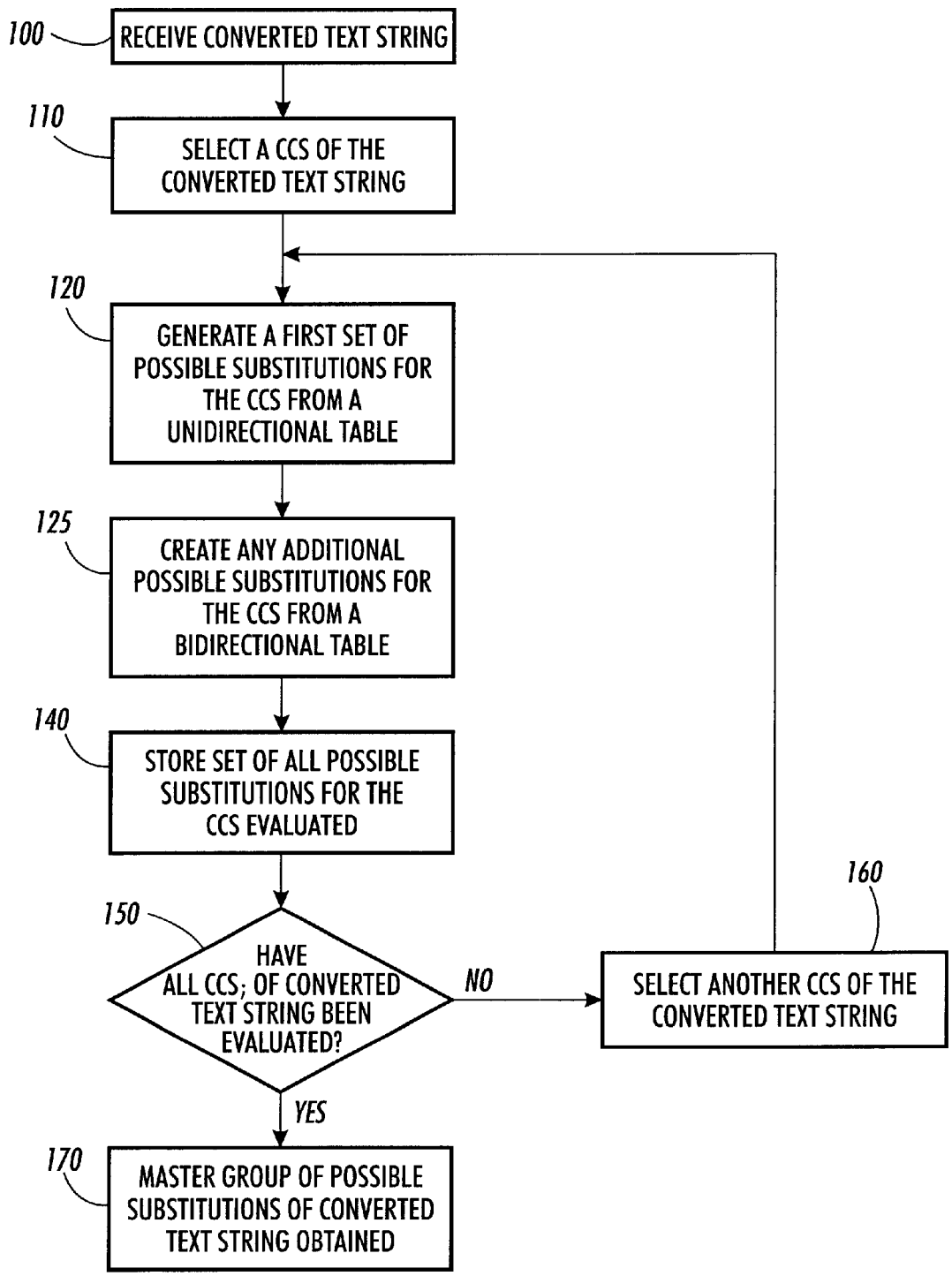
FIGS. 1 and 2 are example flowcharts illustrating example steps of the methods of the invention, and are explained more fully below.

The method of this invention is carried out utilizing a software algorithm, i.e., it is carried out using a device such as a computer capable of running the program implementing the method. The software algorithm maps the characters resulting from the conversion of an image to electronic converted text using any optical character recognition (OCR) or intelligent character recognition (ICR) method and device. The use of OCR or ICR methods and devices to derive converted text from an image are very well known and standard in the art, and thus do not require further explanation. These methods may be used to convert either machine printed text or hand printed text, but the methods of the present invention are most applicable to conversion of hand printed text where conversion errors are more predictable. The output of the character recognition processing is a sequence of character codes representing the converted text sequence.

The present invention is most preferably conducted with respect to text that contains both alphabetical and numerical characters, i.e., alphanumeric text. Such alphanumeric text can be, for example, product codes, part numbers, document identifiers, etc., which commonly contain both numerals and letters. These types of alphanumeric texts are particularly difficult to process because reference of the text to standard dictionaries always yields a failure and requires user intervention under traditional processing of such types of text.

In the method of the invention, the characters of the converted text are subjected to the algorithm to derive a set or group of possible substitution character sequences for all of the characters of the converted text. Once all of the possible substitution sequences are determined for each subset of characters of the converted text sequence, an overall total (or master) group of possible text sequences can then be derived via the total number of combinations of all of the possible substitution sequences for each subset of characters of the converted text. This master group of sequenced character codes of possible text may then be input to some external matching or verification system to find a match from the master group, which match, if found, is determined to be the correct text of the converted text.

A first aspect of the present invention relates to a method of deriving a set of possible text sequences for character sequences of converted text. The inputs to the method are the converted text and at least one table of substitution sequences, preferably both a unidirectional table and a bi-directional table. If desired, confidence threshold values assigned in the character recognition process may also optionally be input into the method.

The converted text from the character recognition device and method comprises an ordered sequence of characters which have a principle glyph represented by some electronic code. White or blank spaces are also considered to have a principle glyph for inclusion in the sequence, since conversion errors may sometimes include inserting an unwanted space between handwritten characters.

It is possible and allowed in the present invention for each position in the sequence to have more than one possible code. When this occurs, the codes for the position are assumed to be ordered from most probable to least probable. That is, the conversion process was able to make more than one code to the image glyph but confidence levels of the codes could be ranked. Thus, the confidence thresholds exist when the OCR/ICR conversion was able to assign a numeric ranking to the characters of the converted text as to how confident it was that the converted text character was actually as given. Where there can be more than one character at each position of the converted text sequence, each code in the converted text will have a value supplied or a default value can be supplied as known in the art.

The possible substitution character sequences for character code sequences may be a single unidirectional table containing all possible substitution sequences for a given input character sequence. However, given that such a unidirectional table will necessarily be very large in order for every possible substitution sequence for a given character sequence to be included in the table, it is preferable for the single table to be two tables comprised of both a unidirectional substitution table and a bi-directional substitution table from which the set of possible substitution sequences for the given character sequence of the converted text is derived.

The unidirectional table and the bi-directional table have similar structure but different objects in controlling the mapping (substitutions) to transform the converted text to the new set of possible texts. The entries in both tables comprise at least one pair of character code sequences (CCS) whose length is one or more character codes.

Where both unidirectional and bi-directional tables will be used, the unidirectional table is preferably limited to single pairs of character code sequences. The unidirectional table is a mapping of one character sequence (CCS), which may be referred to as the key (K), to the other character sequence of that entry, which is referred to as the substitution sequence (SS). Thus, in the unidirectional substitution table, the occurrence of the character sequence K in the converted text will also be replaced with the SS for that entry in the set of possible texts. The unidirectional table entries are associated with substitutions that go only one way, e.g., if the given key CCS appears in the table, it will be replaced in the set of possible texts with the SS CCS, but not vice versa. This can be particularly useful for substitutions known to go only one possible way, e.g., if we know that there is no underscoring possible in the converted text string, then the CCS "1_" would be substituted unidirectionally via the unidirectional table for a SS CCS such as "L", but the occurrence of "L" would never replaced with "1_" in the set of possible texts.

The bi-directional table is preferably not limited to one pair of CCS's per entry. In the bi-directional table, any given CCS may be considered the key (K), with all of the other CCS values becoming the substitution sequence in turn as multiple possible text values are generated. The swapping of the roles of the CCS values for the entry creates a bi-directional substitution where any CCS of the entry can be substituted for any other CCS during the processing, all such CCS's becoming a substitution sequence during the processing. For example, the CCS "B" may be swapped for "13" as well as "/3" and all three such character sequences may appear in the correct text (and thus all three are identified as substitution sequences for the set of possible texts). In other words, the substitutions are bi-directional in that "B" may be replaced with "13" and vice versa.

In use, the tables are of known length and an index may be used to access the entries.

In the method of the invention, there is no restriction on the maximum length of any character sequence to be evaluated for substitution sequences. Thus, the tables can define a set of substitution rules that cover not only the one-to-one character substitutions, but also the many-to-one (e.g., "13" to "B"), many-to-many (e.g., "13" to "/3") and one-to-none (e.g., white space character to no character—i.e., characters are removed from the sequence) substitutions.

The implementing program executes program steps to form one to many possible text character sequences to be used for external processing. Standard programming techniques for forming all possible combinations are used to ensure that all possible values of the possible text set are generated for a given length of converted text. The basic steps are to form a possible text from the ICR/OCR converted text, then make the substitution(s) based on the table(s) making a new possible text value. The operation is recursive in that once a possible text sequence is formed, the sub-sequence of character(s) to the right of the last substitution is treated as a new possible text to test for and generate more substitutions. Looping over the substitution table(s) entries causes all possible mappings to occur for a given converted text value. Thus, it can be seen that in the case where both a unidirectional and bi-directional substitution table is utilized, either table may be searched first.

Thus, by way of example, in the method; the first character of the converted text may be subjected to generation of a set of possible substitution characters associated with that character of converted text. If no substitution was found for the first character, then the next character of the converted text sequence is added to the first character, and this sequence of two characters is subjected to the generation of sets of possible texts. Thus, the CCS may comprise one or more in-sequence characters, or subsequences, of the converted text sequence. This continues until all of the characters have been added to the CCS for generation of associated possible text sequences. The process then restarts for the second character of the converted text sequence, and continues until a total master group of possible text sequences for the entire length of the converted text sequence is derived.

In the process, characters unlikely to be errors, for example as determined by an associated confidence threshold value, may be excluded from the evaluation process. Thus, as a first step to the evaluation, the converted text sequence may be evaluated for determination of possible erroneous character sequences comprised of one or more in-sequence character sequences, and the evaluation limited to these possible erroneous character sequences.

As mentioned previously, the method is most applicable to being applied to short converted text sequences comprised of mixed alphanumeric text such as product codes, part numbers, document identifiers, etc., that are comprised of nearly random text.

An example flowchart of the method is shown in FIG. 1. In the figure, the converted text string is first received into the method (100). A desired character code sequence (CCS) comprised of one or more characters of the converted text string is then selected for generation of all character substitutions that might be possible for the selected CCS (110). The complete set of possible substitutions is then generated via looping of the selected CCS over a unidirectional table and a bi-directional table as discussed above (120 and 125). As noted, if desired, use of the bi-directional table in step 125 can be omitted if the unidirectional table is made to contain all possible substitutions for a given CCS. Also, steps 120 and 125 may be conducted in either order as desired, use of the unidirectional table in 120 being shown first for convenience.

Following use of the table(s), the generated set of possible substitutions is stored for the CCS evaluated (140). A determination is then made as to whether or not all desired CCS of the converted text string have been evaluated for generation of possible substitutions (150). If so, the master group of possible text substitutions is obtained from the sets of stored substitutions for each CCS (170). If not, the next CCS to be evaluated is selected (160), and this CCS then subjected to steps 120 and 125 as with the first selected CCS as discussed above.

Once the master group of possible text sequences for a length of converted text has been obtained, the group can then be compared to an external matching or verification system, for example an external database, in order to find a match from the external source to one of the possible texts. The external matching or verification may include, e.g., product codes. If a single match among the group of possible texts is found, that match is accepted as the correct text, and the need to query for human intervention is eliminated. Only if no matches are found from the entire group of possible texts, or in the less likely occasion that more than a single match is found, is a user queried for intervention in determining the correct text.

Figure 2:
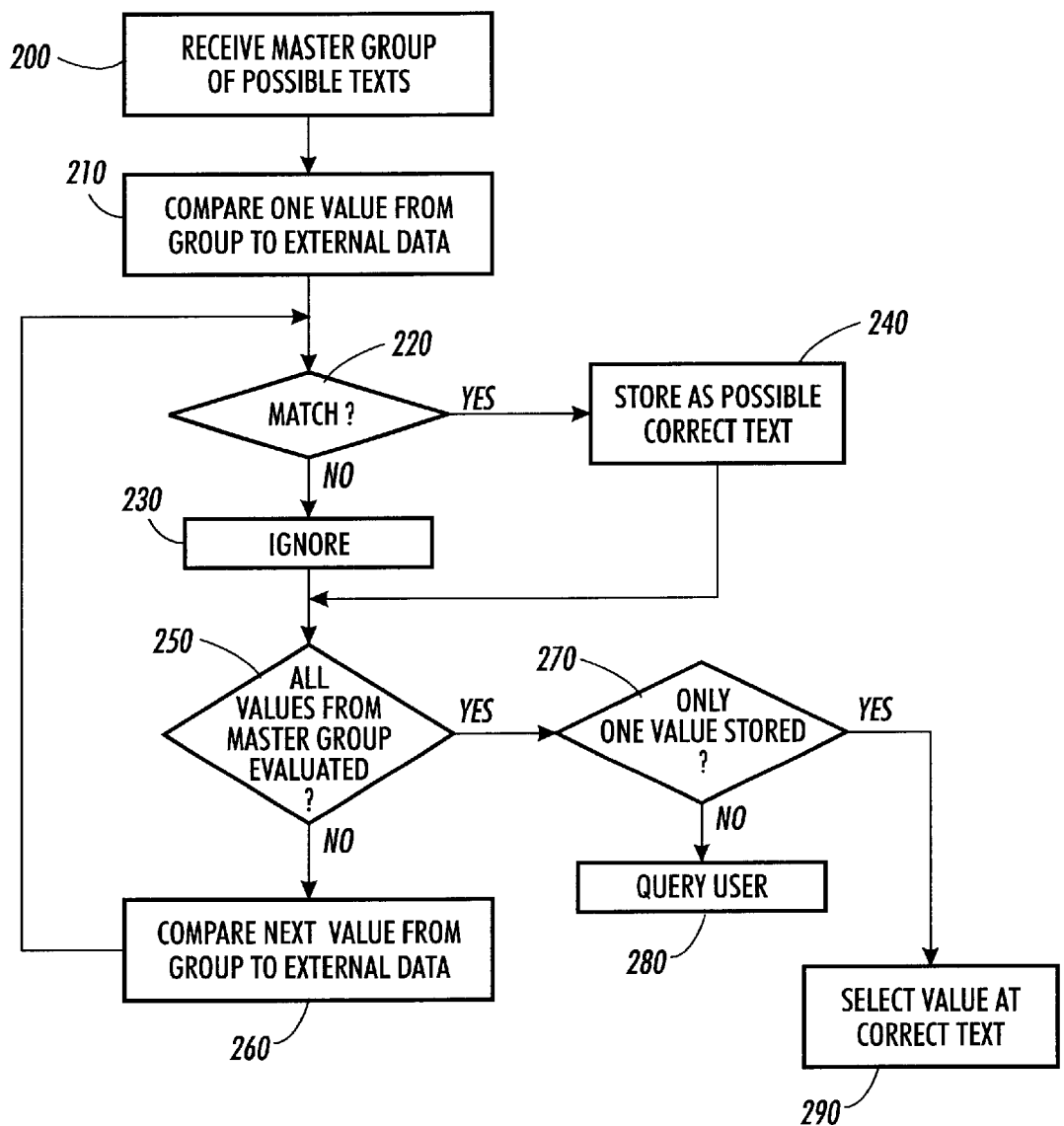

In FIG. 2, a further example flowchart is shown for selection of correct text from the generated master group of possible texts. The master group of possible texts, for example generated as discussed above from the substitution table(s), is first received (200). One of the values from the master group is then selected and compared to external data in an effort to find a match (210, 220). If a match is found, this value is stored as a possible correct text (240). If a match is not found for the selected value of the group in the external data, the member is ignored (230). Once all of the values of the master group have been evaluated for a match (250, 260), then if only one value was stored as possible correct text (270), the stored value is selected as correct text (290). Otherwise, a user must be queried to request the correct information be input (i.e., the user is signaled of the failure to correct the text) (280).

The method of the invention is quite novel at least in that it extends the common one-to-one substitutions to cover the range of one-to-none, many-to-many and many-to-one substitutions through a unidirectional table.

While the present invention has been described in connection with practical and preferred embodiments thereof, it is to be understood that the invention is not limited solely to the specifically disclosed embodiments, but is intended to cover various modifications and equivalent arrangements included within the spirit and scope of the appended claims.

What is claimed is:

1. A method of deriving a set of possible text sequences for character sequences of converted text, comprising receiving as input a length of converted text from a character recognition device;

comparing a character sequence comprised of one or more in-sequence characters of the converted text to a first table containing either unidirectional or bi-directional substitution sequences to obtain a set of substitution sequences associated with the character sequence;

and subsequently comparing the character sequence to a second table containing either unidirectional or bi-directional substitution sequences, wherein if the first table is a unidirectional table then the second table is a bi-directional table and if the first table is a bi-directional table then the second table is a unidirectional table, to obtain any additional possible substitution sequences associated with the character sequence, wherein the unidirectional table is a tabulation of substitutions that proceed in only one direction such that occurrence of an impossible character sequence in the converted text results in inclusion of one or more possible corresponding substitution sequences in the set of substitution sequences but occurrence of one of the one or more possible substitution sequences in the converted text does not result in inclusion of the corresponding impossible character sequence in the set of substitution sequences, and wherein the bi-directional table comprises at least one character sequence and one or more corresponding substitution sequences, and in which occurrence of the character sequence in the converted text results in inclusion of the one or more corresponding substitution sequences in the set of substitution sequences as well as inclusion of any additional substitution sequences associated with each of the one or more corresponding substitution sequences in the set of substitution sequences;

the obtained character sequence and associated substitution sequences representing the set of possible text sequences for the character sequence of the converted text.

2. The method according to claim 1, wherein the method is repeated for all character sequences of the converted text to obtain a set of possible text sequences associated with each character sequence of the converted text, thereby obtaining a master group of possible text sequences for the entire length of the converted text.

3. The method according to claim 2, wherein the method further comprises comparing the master group of possible text sequences for the entire length of the converted text to external data for a match.

4. The method according to claim 3, wherein if one match is found in the external data, the match is returned as a correct text sequence, and if no match or more than one match is found, a user is queried for input of the correct text.

5. The method according to claim 1, wherein the character sequences may be of any length and the substitution sequences may also be of any length, thereby enabling one-to-one, one-to-many, many-to-one and one-to-none character substitutions in the set of possible text sequences.

6. The method according to claim 1, wherein the converted text comprises both numerical and alphabetical characters.

7. The method according to claim 1, wherein the characters of the converted text include confidence threshold values associated with the characters of the converted text.

8. A method of matching converted text from a character recognition device to correct text, comprising receiving as input a length of converted text from a character recognition device;

comparing one or more character sequences comprised of one or more in-sequence character sequences of the converted text to at least one table containing substitution sequences to obtain a set of substitution sequences associated with each such character sequence evaluated, thereby obtaining a master group of possible text sequences for the length of the converted text; and comparing the master group of possible text sequences for the length of the converted text to external data for a match;

wherein the comparing of the character sequences to at least one table comprises:

comparing the character sequence to a first table containing either unidirectional or bi-directional substitution sequences to obtain a subset of substitution sequences associated with the character sequence evaluated;

and subsequently comparing the character sequence to a second table containing either unidirectional or bi-directional substitution sequences, wherein if the first table is a unidirectional table then the second table is a bi-directional table and if the first table is a bi-directional table then the second table is a unidirectional table, to obtain any additional possible substitution sequences associated with the character sequence, thereby obtaining the set of substitution sequences associated with the character sequence, wherein the unidirectional table is a tabulation of substitutions that proceed in only one direction such that occurrence of an impossible character sequence in the converted text results in inclusion of one or more possible corresponding substitution sequences in the set of substitution sequences but occurrence of one of the one or more possible substitution sequences in the converted text does not result in inclusion of the corresponding impossible character sequence in the set of substitution sequences, and wherein the bi-directional table comprises at least one character sequence and one or more corresponding substitution sequences, and in which occurrence of the character sequence in the converted text results in inclusion of the one or more corresponding substitution sequences in the set of substitution sequences as well as inclusion of any additional substitution sequences associated with each of the one or more corresponding substitution sequences in the set of substitution sequences.

9. The method according to claim 8, wherein if one match is found in the external data, the match is returned as a correct text sequence, and if no match or more than one match is found, a user is queried for input of the correct text.

10. The method according to claim 8, wherein the character sequences may be of any length and the substitution sequences may also be of any length, thereby enabling one-to-one, one-to-many, many-to-one and one-to-none character substitutions in the possible text sequences.

11. The method according to claim 8, wherein the converted text comprises both numerical and alphabetical characters.

12. A method of matching converted text from a character recognition device to correct text, comprising receiving as input a length of converted text sequence from a character recognition device;

evaluating the length of converted text and determining possible erroneous character sequences comprised of one or more in-sequence character sequences;

comparing each of the possible erroneous character sequences to at least one table containing substitution sequences to obtain a set of substitution sequences associated with each of the character sequences, thereby obtaining a master group of possible text sequences for the entire length of the converted text sequence; and comparing the master group of possible text sequences for the entire length of the converted text sequence to external data for a match;

wherein the comparing of the possible erroneous character sequences to at least one table comprises:

comparing the possible erroneous character sequence to a first table containing either unidirectional or bi-directional substitution sequences to obtain a subset of substitution sequences associated with the character sequences;

and subsequently comparing the possible erroneous character sequence to a second table containing either unidirectional or bi-directional substitution sequences, wherein if the first table is a unidirectional table then the second table is a bi-directional table and if the first table is a bi-directional table then the second table is a unidirectional table, to obtain any additional possible substitution sequences associated with the character sequence, thereby obtaining the set of substitution sequences associated with the character sequence, wherein the unidirectional table is a tabulation of substitutions that proceed in only one direction such that occurrence of an impossible character sequence in the converted text results in inclusion of one or more possible corresponding substitution sequences in the set of substitution sequences but occurrence of one of the one or more possible substitution sequences in the converted text does not result in inclusion of the corresponding impossible character sequence in the set of substitution sequences, and wherein the bi-directional table comprises at least one character sequence and one or more corresponding substitution sequences, and in which occurrence of the character sequence in the converted text results in inclusion of the one or more corresponding substitution sequences in the set of substitution sequences as well as inclusion of any additional substitution sequences associated with each of the one or more corresponding substitution sequences in the set of substitution sequences.

13. The method according to claim 12, wherein if one match is found in the external database, the match is returned as a correct text sequence, and if no match or more than one match is found, a user is queried for input of the correct text.

14. The method according to claim 12, wherein the possible erroneous character sequences may be of any length and the substitution sequences may also be of any length, thereby enabling one-to-one, one-to-many, many-to-one and one-to-none character substitutions in the possible text sequences.

15. The method according to claim 12, wherein the converted text comprises both numerical and alphabetical characters.

16. The method according to claim 12, wherein the characters of the converted text include confidence threshold values associated with the characters of the converted text, which confidence threshold values can be used in the determination of possible erroneous character sequences.

17. An apparatus for deriving a set of possible text sequences for character sequences of converted text, comprising a text processing device that receives as input converted text from a character recognition device and at least one table containing substitution sequences associated with character sequences that might be found in the converted text, the device including a program for analyzing the converted text and deriving the set of possible text sequences according to the method of claim 1.

18. An apparatus for matching converted text from a character recognition device to correct text, comprising a text processing device that receives as input converted text from a character recognition device and at least one table containing substitution sequences associated with character sequences that might be found in the converted text, the device including a program for analyzing the converted text, deriving the master group of possible text sequences, and comparing the master group to the external data according to the method of claim 8.

19. An apparatus for matching converted text from a character recognition device to correct text, comprising a text processing device that receives as input converted text from a character recognition device and at least one table containing substitution sequences associated with character sequences that might be found in the converted text, the device including a program for analyzing the converted text and deriving the master group of possible text sequences, and comparing the master group to the external data according to the method of claim 12.

\* \* \* \* \*